(12) United States Patent
Matsui (10) Patent No.: US 9,800,790 B2
(45) Date of Patent: Oct. 24, 2017

(54) IMAGE CAPTURING APPARATUS CAPABLE OF DETECTING GEOMAGNETISM, CONTROL METHOD, AND STORAGE MEDIUM

(71) Applicant: CANON KABUSHIKI KAISHA, Tokyo (JP)

(72) Inventor: Takashi Matsui, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 25 days.

(21) Appl. No.: 14/850,345

(22) Filed: Sep. 10, 2015

(65) Prior Publication Data

US 2016/0080655 A1    Mar. 17, 2016

(30) Foreign Application Priority Data

Sep. 11, 2014  (JP) ................. 2014-185697

(51) Int. Cl.
  *H04N 5/222*  (2006.01)
  *H04N 5/232*  (2006.01)
  *G01C 17/28*  (2006.01)

(52) U.S. Cl.
  CPC ......... *H04N 5/23293* (2013.01); *G01C 17/28* (2013.01); *H04N 5/23245* (2013.01)

(58) Field of Classification Search
  CPC .................................................. G01C 17/28
  See application file for complete search history.

(56) References Cited

U.S. PATENT DOCUMENTS

| | | | | |
|---|---|---|---|---|
| 8,472,796 B2* | 6/2013 | Watanabe | ............ | G01C 17/38 396/50 |
| 9,277,118 B2* | 3/2016 | Matsui | ............ | H04N 5/23229 |
| 2012/0268621 A1* | 10/2012 | Kanma | ............ | H04N 5/225 348/222.1 |
| 2014/0074429 A1* | 3/2014 | Chow | ............ | G01R 33/0035 702/154 |
| 2014/0325858 A1* | 11/2014 | Mayor | ............ | G01C 17/38 33/303 |

FOREIGN PATENT DOCUMENTS

| | | | |
|---|---|---|---|
| JP | 2005291936 A | * | 10/2005 |
| JP | 2013-121137 A | | 6/2013 |

* cited by examiner

*Primary Examiner* — Gary C Vieaux
(74) *Attorney, Agent, or Firm* — Cowan, Liebowitz & Latman, P.C.

(57) ABSTRACT

An image capturing apparatus comprising: an image capturing unit configured to capture an image of a subject and output an image signal; a control unit configured to control a current supplied to the image capturing unit; and an azimuth direction acquisition unit configured to detect geomagnetism, and acquire azimuth direction information indicating a direction in which the image capturing apparatus is oriented, based on the detected geomagnetism, wherein the azimuth direction acquisition unit detects the geomagnetism while a current is supplied to the image capturing unit, and acquires azimuth direction information in which an influence on the detected geomagnetism, the influence being caused by the supplied current, has been corrected.

7 Claims, 11 Drawing Sheets

IMAGE CAPTURING APPARATUS CAPABLE OF DETECTING GEOMAGNETISM, CONTROL METHOD, AND STORAGE MEDIUM

BACKGROUND OF THE INVENTION

Field of the Invention

The present invention relates to image capturing apparatuses, control methods, and storage medium, and particularly to an image capturing apparatus having a geomagnetism detection function.

Description of the Related Art

Some image capturing apparatuses such as digital cameras have a GPS and a geomagnetism detection sensor such as a so-called electronic compass, and add information of a position and an azimuth direction at which shooting is performed to a shot image or display information of the current position and azimuth direction on a display apparatus (Japanese Patent Laid-Open No. 2013-121137).

However, with recent reductions in the size of the image capturing apparatuses, members such as an image sensor, an image processing circuit, and a driving system are arranged close to the geomagnetism detection sensor within each apparatus. In this case, a magnetic field (induced magnetic field) generated when current flows via an electric wire at the time of power supply to various members may possibly affect a result of detection of the geomagnetism detection sensor. In particular, when an image is captured in an image capturing apparatus, there are various kinds of processing that can be factors causing generation of an induced magnetic field, such as driving of a driving system, light reception of an image sensor, generation of an image signal, and recording of the image signal in a storage medium.

SUMMARY OF THE INVENTION

The present invention was made in view of such problems in the conventional technique. The present invention provides an image capturing apparatus that favorably detects the azimuth direction corresponding to a captured image, a control method, and a storage medium.

The present invention in its first aspect provides an image capturing apparatus comprising: an image capturing unit configured to capture an image of a subject and output an image signal; a control unit configured to control a current supplied to the image capturing unit; and an azimuth direction acquisition unit configured to detect geomagnetism, and acquire azimuth direction information indicating a direction in which the image capturing apparatus is oriented, based on the detected geomagnetism, wherein the azimuth direction acquisition unit detects the geomagnetism while a current is supplied to the image capturing unit, and acquires azimuth direction information in which an influence on the detected geomagnetism, the influence being caused by the supplied current, has been corrected.

The present invention in its second aspect provides an image capturing apparatus comprising: an image capturing unit configured to capture an image of a subject and output an image signal; a control unit configured to control output of the image signal of the image capturing unit; and an azimuth direction acquisition unit configured to detect geomagnetism, and acquire azimuth direction information indicating a direction in which the image capturing apparatus is oriented, based on the detected geomagnetism, wherein the azimuth direction acquisition unit detects the geomagnetism during an operation of the image capturing unit, the operation being related to the output of the image signal, and acquires azimuth direction information in which an influence on the detected geomagnetism, the influence being caused by a current supplied for the output of the image signal, has been corrected.

The present invention in its third aspect provides a method for controlling an image capturing apparatus having an image capturing unit, the method comprising: an output step of outputting an image signal of a subject whose image has been captured by the image capturing unit; a control step of controlling a current supplied to the image capturing unit; and an azimuth direction acquisition step of detecting geomagnetism, and acquiring azimuth direction information indicating a direction in which the image capturing apparatus is oriented, based on the detected geomagnetism, wherein in the azimuth direction acquisition step, the geomagnetism is detected while a current is supplied to the image capturing unit, and azimuth direction information in which an influence on the detected geomagnetism, the influence being caused by the supplied current, has been corrected is acquired.

The present invention in its fourth aspect provides a method for controlling an image capturing apparatus having an image capturing unit, the method comprising: an output step of outputting an image signal of a subject whose image has been captured by the image capturing unit; a control step of controlling the output of the image signal in the output step; and an azimuth direction acquisition step of detecting geomagnetism, and acquiring azimuth direction information indicating a direction in which the image capturing apparatus is oriented, based on the detected geomagnetism, wherein in the azimuth direction acquisition step, the geomagnetism is detected during an operation of the image capturing unit, the operation being related to the output of the image signal, and azimuth direction information in which an influence on the detected geomagnetism, the influence being caused by a current supplied for the output of the image signal, has been corrected is acquired.

The present invention in its fifth aspect provides a computer-readable storage medium recording a program for causing a computer, which comprises an image capturing unit configured to capture an image of a subject and output an image signal, to function as the following unit: a control unit configured to control a current supplied to the image capturing unit; and an azimuth direction acquisition unit configured to detect geomagnetism, and acquire azimuth direction information indicating a direction in which the image capturing apparatus is oriented, based on the detected geomagnetism, wherein the azimuth direction acquisition unit detects the geomagnetism while a current is supplied to the image capturing unit, and acquires azimuth direction information in which an influence on the detected geomagnetism, the influence being caused by the supplied current, has been corrected.

The present invention in its sixth aspect provides a computer-readable storage medium recording a program for causing a computer, which comprises an image capturing unit configured to capture an image of a subject and output an image signal, to function as the following unit: a control unit configured to control output of the image signal of the image capturing unit; and an azimuth direction acquisition unit configured to detect geomagnetism, and acquire azimuth direction information indicating a direction in which the image capturing apparatus is oriented, based on the detected geomagnetism, wherein the azimuth direction acquisition unit detects the geomagnetism during an operation of the image capturing unit, the operation being related to the output of the image signal, and acquires azimuth direction information in which an influence on the detected geomagnetism, the influence being caused by a current supplied for the output of the image signal, has been corrected.

Further features of the present invention will become apparent from the following description of exemplary embodiments with reference to the attached drawings.

DESCRIPTION OF THE EMBODIMENTS

Embodiment 1

An exemplary embodiment of the present invention will be described below in detail with reference to the drawings. The following embodiment will describe an example of applying the present invention to a digital camera that serves as an exemplary image capturing apparatus and has an image sensor and a geomagnetism detection sensor for detecting an azimuth direction. However, the present invention is applicable to any device capable of correcting azimuth direction information acquired by geomagnetism detection under a condition that may possibly cause an induced magnetic field to be generated.

Functional Configuration of Digital Camera 100

Figure 1:
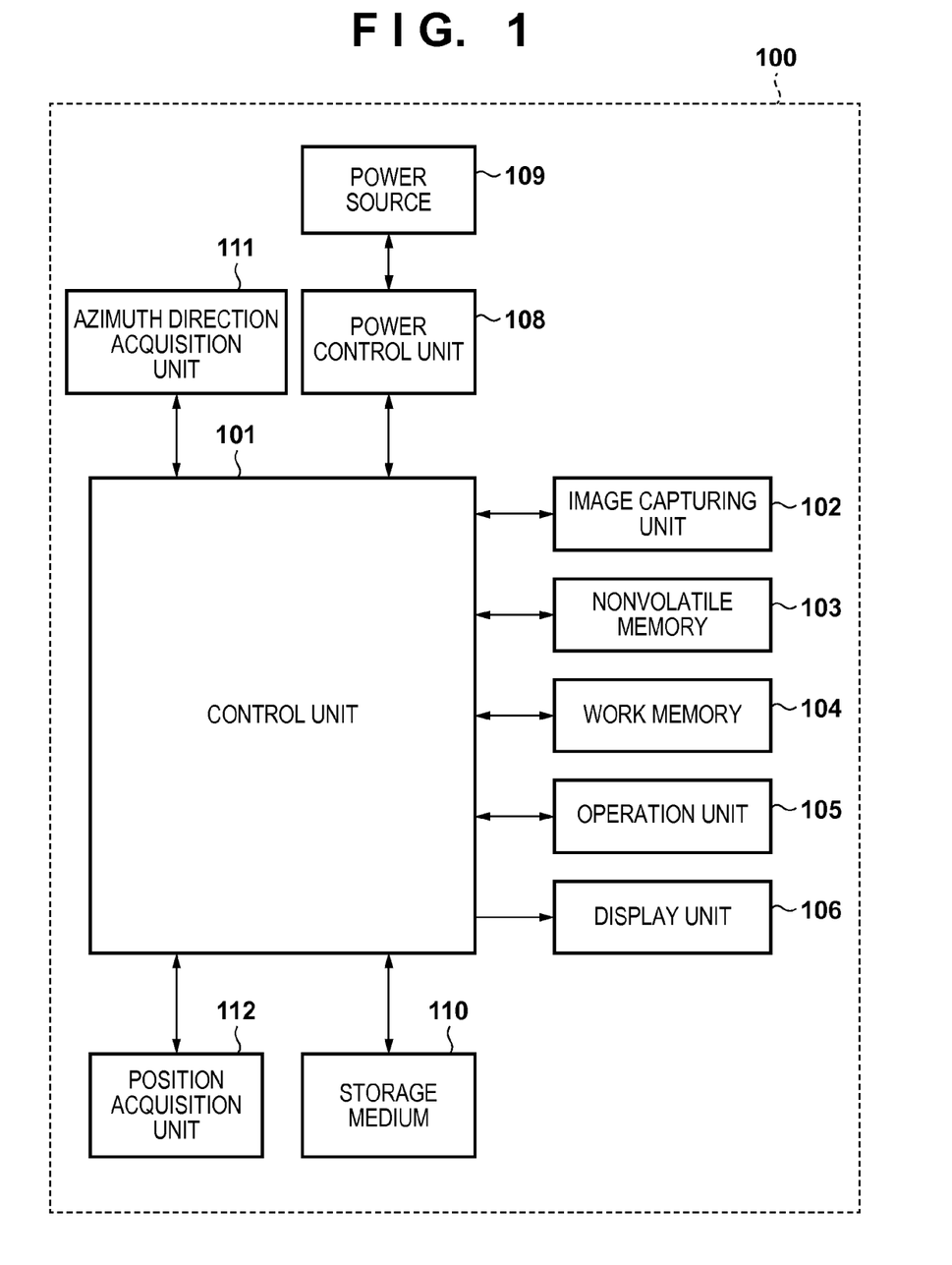
FIG. 1 is a block diagram showing a functional configuration of a digital camera 100 according to an embodiment of the present invention.

FIG. 1 is a block diagram showing a functional configuration of a digital camera 100 according to the embodiment of the present invention.

A control unit 101 is a CPU or the like, for example, and controls operations of each block that the digital camera 100 has. Specifically, the control unit 101 reads out an operation program for each block stored in a later-described nonvolatile memory 103, and deploys and executes the operation program in a work memory 104, thereby controlling the operations of each block.

An image capturing unit 102 has an image sensor such as a CCD or a CMOS sensor, for example. The image capturing unit 102 acquires an analog image signal by performing photoelectric conversion on an optical image formed on an imaging plane of the image sensor via an imaging optical system (not shown). Output thereof is performed when the image capturing unit 102 receives a timing signal (VD signal) that is output by the control unit 101. The image capturing unit 102 also applies noise reduction processing, A/D conversion processing, and the like on the obtained analog image signal, and outputs digital image data (hereinafter referred to simply as image data) to the work memory 104, which is a buffer memory. A time period from when the image capturing unit 102 performs image capturing (photoelectric conversion) until the image capturing unit 102 finishes the output of the image data based on the reception of the VD signal will be referred to as a "transfer period" in this specification. It is assumed that, during the transfer period, a current whose current amount per unit time is substantially fixed is supplied to the image capturing unit 102 by a later-described power control unit 108.

A nonvolatile memory 103 is an electrically erasable and recordable nonvolatile storage device such as a rewritable ROM, for example. The nonvolatile memory 103 stores the operation program for each of the aforementioned blocks that the digital camera 100 has, as well as information such as parameters that is necessary in the operations of each block. The work memory 104 is a volatile storage device such as a RAM that temporarily stores data, for example. The work memory 104 is used not only as an area in which the operation program for each block is deployed, but also as a storage area, such as a buffer memory for image data output by the aforementioned image capturing unit 102, for temporarily storing intermediate data or the like that is output as a result of an operation of each block.

The operation unit 105 is a user interface that the digital camera 100 has, and includes operation members such as a power button for giving an instruction to turn on or off the power, a release switch for giving an image capturing instruction, and a reproduction button for giving an instruction to reproduce the image data, for example. If a display unit 106 is configured to be able to detect a touch operation made on a display surface thereof, the operation unit 105 also includes an interface related to detection of the touch operation. The operation unit 105, upon detecting that an operational input has been made on any operation member by a user, outputs a control signal corresponding to this operation to the control unit 101. For example, if it is detected that the release switch is in a so-called halfway pressed state, the operation unit 105 outputs an SW1 signal to the control unit 101. The control unit 101 then starts control for executing processing for preparing for image capturing, such as AF (auto-focus) processing, AE (auto-exposure) processing, AWB (auto-white balancing) processing, and EF (flash pre-lighting) processing, in accordance with reception of the SW1 signal. If it is detected that the release switch is in a so-called fully pressed state, the operation unit 105 outputs an SW2 signal to the control unit 101, and the control unit 101 starts control for executing processing related to shooting, in accordance with reception of this signal.

The display unit 106 is a display apparatus such as an LCD that is connected to the digital camera 100, for example. The display unit 106 functions as an electronic view finder by displaying (through-the-lens display) the image data output from the image capturing unit 102 as a result of the image capturing in a display area. In addition, image data recorded as a result of shooting, and images and character strings related to various GUIs are displayed in the display area of the display unit 106. Note that the display unit 106 does not necessarily have to be a display apparatus incorporated in the digital camera 100, and may be a display apparatus that is externally connected to the digital camera 100 via a prescribed display output interface, for example.

A power control unit 108 controls power supply to each unit of the digital camera 100. Although the description of the present embodiment will take, as an example, the case of employing a power source 109, which is a detachable battery, as a power supply source, it should be noted that the present invention is not limited thereto. For example, a configuration may be employed in which power is acquired from the outside via an AC adapter or the like.

A storage medium 110 is a recording apparatus such as an embedded memory of the digital camera 100, a memory card, or an HDD that is detachably connected to the digital camera 100, for example. Image data obtained by shooting that is based on the SW2 signal is recorded in the storage medium 110. Note that it is assumed that, when still images and moving images are recorded in the storage medium 110, azimuth direction information and position information at the time of the shooting are recorded in association with the data of the still images and the moving images in the digital camera 100 in the present embodiment, although a specific description of this processing will be omitted.

An azimuth direction acquisition unit 111 is a geomagnetism detection sensor, for example, and outputs azimuth direction information indicating the bearing to which the digital camera 100 is oriented, as a result of detecting the geomagnetism. The geomagnetism detection sensor is a so-called electronic compass. The azimuth direction acquisition unit 111 detects the geomagnetism generated on the earth based on two axes (X axis, Y axis) or three axes (X axis, Y axis, Z axis), calculates, from this information, the shooting direction of the camera relative to the geomagnetism, and outputs the calculated shooting direction as the azimuth direction information. The azimuth direction acquisition unit 111 operates under the control of the control unit 101, outputs the azimuth direction information by regularly performing the detection, for example, and causes the work memory 104 to store the output azimuth direction information. In the digital camera 100 in the present embodiment, if the azimuth direction information is already stored in the work memory 104, this information is overwritten by the newly output azimuth direction information, such that the latest azimuth direction information is always stored in the work memory 104. Note that, in order to stabilize numeric values, the latest azimuth direction information may be calculated by applying processing for smoothing a plurality of sets of azimuth direction information that were output in the past, by means of moving average processing or the like. The azimuth direction acquisition unit 111 in the present embodiment may be configured to further include an acceleration sensor such as a gyro-sensor and use a result of movement detection in the calculation of the azimuth direction information.

Figure 2:
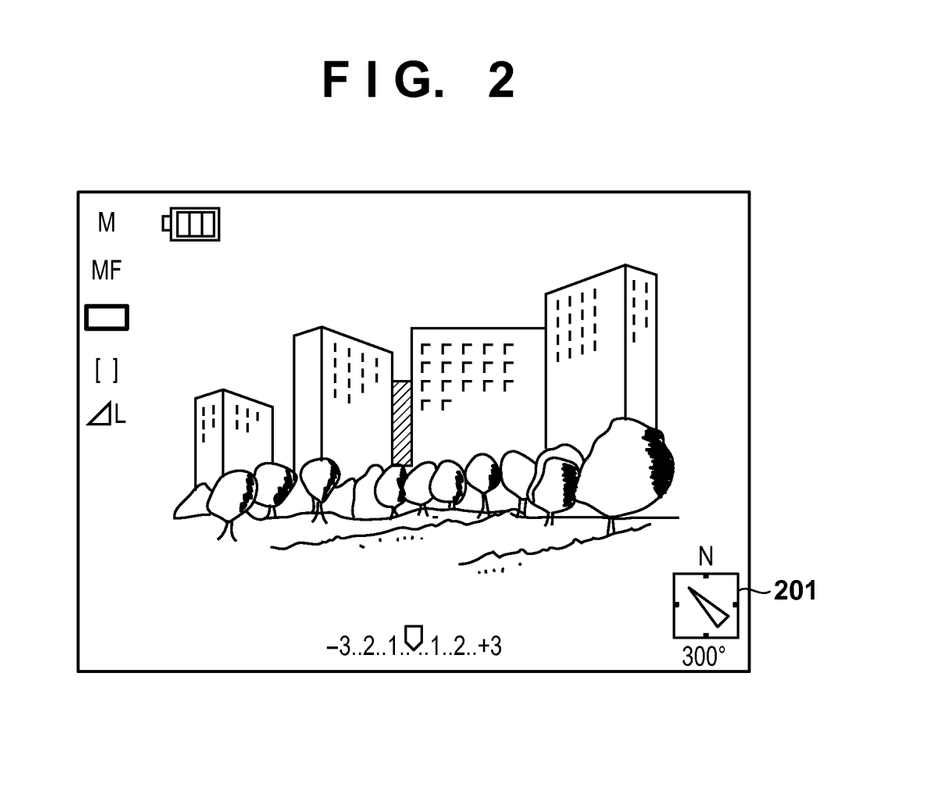
FIG. 2 is a diagram showing exemplary display of azimuth direction information in the digital camera 100 according to an embodiment of the present invention.

The latest azimuth direction information may be presented to a photographer by a prescribed GUI 201 in the display area as shown in FIG. 2 when the display unit 106 is functioning as an electronic view finder or during moving image shooting, for example. In the example in FIG. 2, the azimuth direction is expressed with the magnetic north as a reference, and is displayed as a number in the range from 0° to 359°, where 0° indicates the north, 90° indicates the east, 180° indicates the south, and 270° indicates the west. The resolution of the displayed azimuth direction does not need to be every 1°, and may be every 15° or every 30°, for example.

A position acquisition unit 112 performs positioning processing for receiving signals from GPS satellites and acquiring position information that indicates the position of the digital camera 100 from the received signals, for example. The position information acquired by the position acquisition unit 112 may be configured to be regularly stored in the work memory 104 as the azimuth direction information is, or may be acquired only when a shooting instruction is given. The position information in the present embodiment is configured as coordinate values of the latitude and the longitude. The position acquisition unit 112 may be configured to use a result of movement detection in the calculation of the position information, as the azimuth direction acquisition unit 111 does. The method for acquiring the position information is not limited to a method using GPS satellites, and the position information may be acquired by a method of receiving the position information from an external apparatus such as a base station of a mobile phone, for example.

Influence of Induced Magnetic Field Generation on Azimuth Direction Information

A description will now be given first, with reference to FIGS. 3A and 3B, of an influence of an induced magnetic field generated within the digital camera 100 on a result of detection of the azimuth direction information such as that mentioned regarding the problem.

Figure 3A:
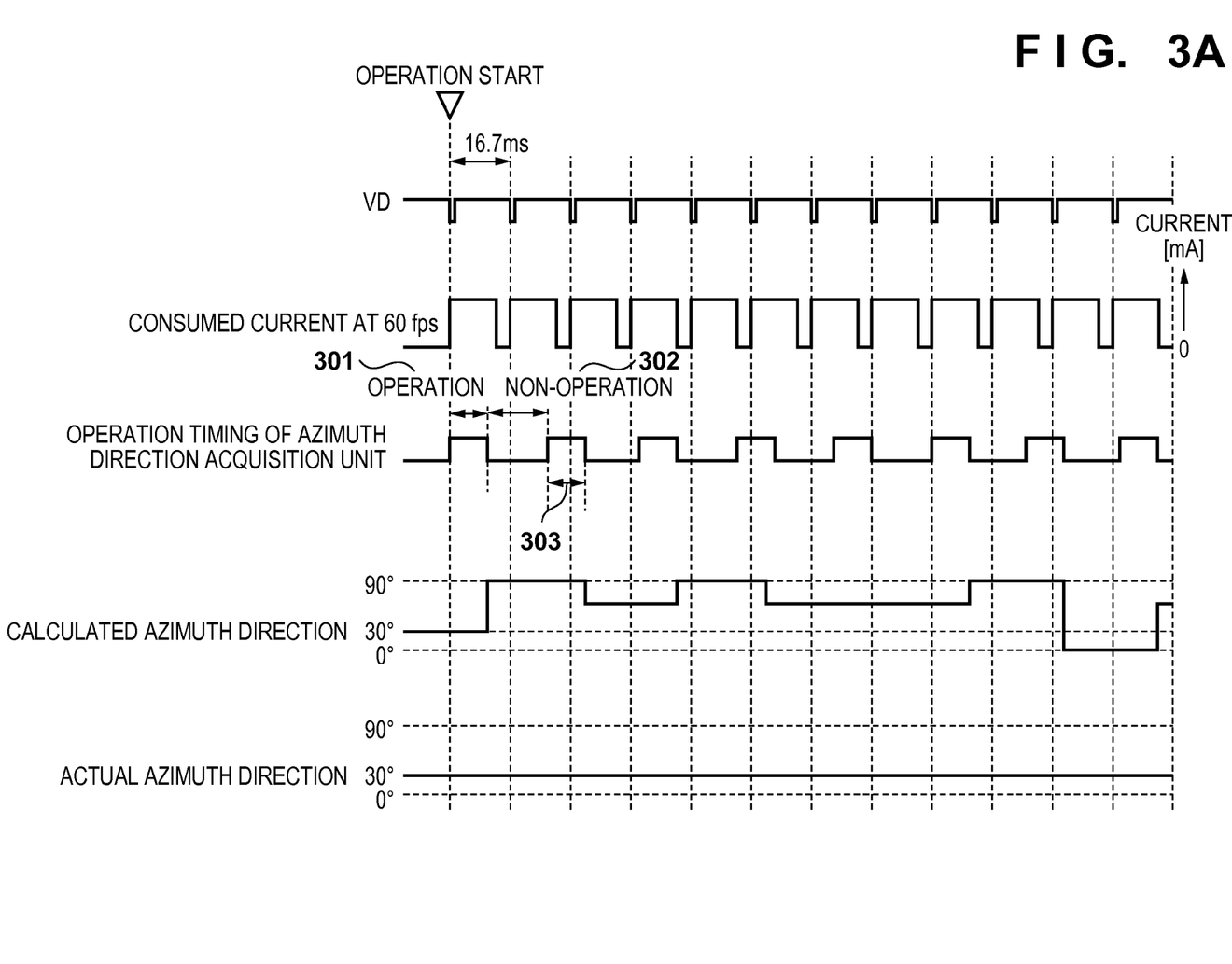
FIGS. 3A and 3B are diagrams illustrating an influence of generation of an induced magnetic field on the azimuth direction information.

FIG. 3A is a diagram showing an exemplary influence on the azimuth direction information in the case where a moving image is being shot at 60 fps. The operation of the image capturing unit 102 related to each frame of the moving image is started in accordance with reception of the VD signal generated by the control unit 101. In the drawing, the waveform shown as a consumed current indicates the amount of current supplied to the image capturing unit 102. The amount of supplied current rises to a fixed amount simultaneously with the VD signal, the fixed amount of current is supplied to the image capturing unit 102 during a prescribed period (transfer period) from the start of the VD signal, and thereafter the current supply is stopped until the next VD signal is received. Although the amount of supplied current may possibly fluctuate slightly at very short time intervals in practice, this fluctuation can be disregarded, considering a later-described detection value integration period in the azimuth direction acquisition unit 111, and accordingly, it should be noted that the current amount per unit time may be deemed to be fixed. In the example in FIG. 3A, the azimuth direction acquisition unit 111 operates so as to regularly detect the geomagnetism at a timing that is asynchronous with the VD signal. Specifically, for example, the azimuth direction acquisition unit 111 integrates the detection value of the geomagnetism detection sensor during an operation period 301, and thereafter an operation of updating the azimuth direction information in the work memory 104 is performed, and therefore, if a change has occurred from the previously detected geomagnetism, the value changes in a non-operation period 302.

In the example in FIG. 3A, although the actual azimuth direction does not fluctuate from 30° as indicated in the lowermost part, power is being simultaneously supplied to the image capturing unit 102, the azimuth direction is therefore affected by the magnetism generated due to this power supply, and the azimuth direction calculated by the azimuth direction acquisition unit 111 fluctuates. More specifically, the output of the azimuth direction acquisition unit 111 that indicates 30° until the moving image shooting operation is started changes to 90° after the operation period 301 that passes while power is supplied to the image capturing unit 102, since the influence of the induced magnetic field is generated. Since the current amount per unit time during the operation period 301 is roughly fixed, it should be noted that the influence of the induced magnetic field is also fixed. For this reason, the azimuth direction calculated during the operation period 304 is 90° due to the same influence as that during the operation period 301.

On the other hand, since the next operation period 303 includes a period during which power is supplied to the image capturing unit 102 and a period during which power is not supplied thereto, the induced magnetic field fluctuates and a result of integration of the detection value of the azimuth direction acquisition unit 111 changes during the operation period 303, and therefore the indicated azimuth direction is higher than 30° and smaller than 90°. The azimuth direction at this time changes depending on a ratio between the period during which power is supplied and the period during which power is not supplied. Thus, in the case where the azimuth direction information is regularly output by the azimuth direction acquisition unit 111 at a timing asynchronous with the VD signal, even if the actual orientation of the digital camera 100 does not change, the detection result fluctuates due to a change of the induced magnetic field that has an influence.

Figure 3B:
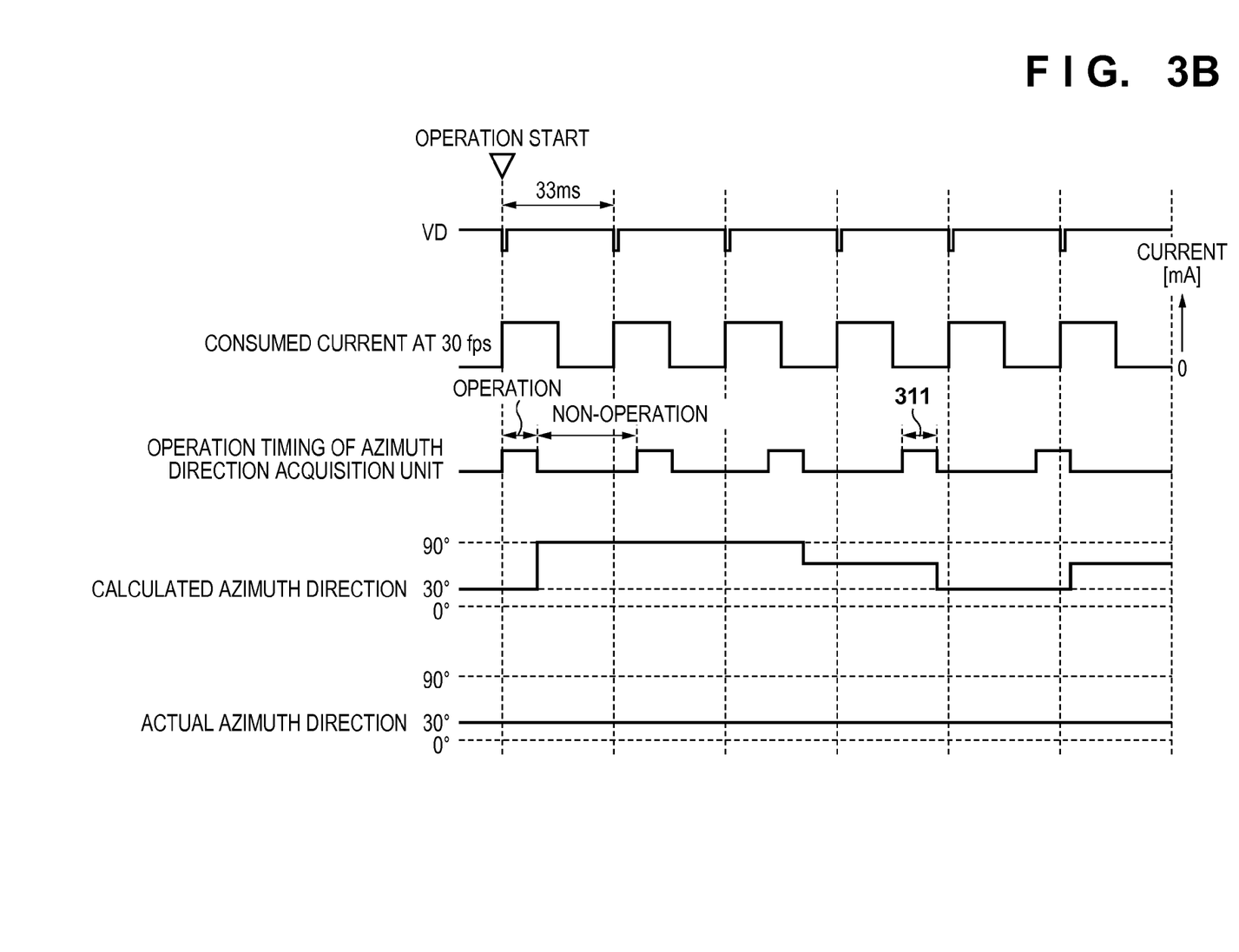

FIG. 3B shows an exemplary influence on the azimuth direction information in the case where an image displayed on the electronic view finder at 30 fps, which is a wider time interval than in the shooting of a moving image, is being captured. As in the shooting of a moving image, the detection result also fluctuate even when the azimuth direction of the digital camera 100 does not change in the case where the azimuth direction information is regularly output by the azimuth direction acquisition unit 111 at a timing asynchronous with the VD signal. Note that, in the example in FIG. 3B, a non-transfer period during which power is not supplied to the image capturing unit 102 is longer than that at the time of shooting a moving image. For this reason, in the operation period 311 within which the azimuth direction acquisition unit 111 operates, at least an induced magnetic field caused by power supply to the image capturing unit 102 is not generated, and accordingly the azimuth direction information indicates a value similar to the actual azimuth direction.

Thus, if the azimuth direction information is output within the non-transfer period by the azimuth direction acquisition unit 111, such fluctuation of the value of the azimuth direction information as that shown in FIGS. 3A and 3B is not generated. However, in recent years, there is a situation where the non-transfer period cannot be set longer than the operation period of the azimuth direction acquisition unit 111 that is necessary for calculating the azimuth direction information as shown in FIG. 3A, for the reason of achieving an increase in the number of pixels in the image sensor and shooting of a moving image at a high frame rate. That is to say, even if the operation of the azimuth direction acquisition unit 111 is started when the non-transfer period is started, the next transfer period starts and the current amount will change. In the case where this change of the current amount, i.e., a change of the influence of the induced magnetic field occurs, it is difficult to correct, in real time, the azimuth direction information affected by this change. For this reason, the digital camera 100 in the present embodiment performs control such that the azimuth direction information can be favorably acquired even in the case of operating the azimuth direction acquisition unit 111 during the transfer period. Specifically, at least when power is supplied to the image capturing unit 102, the control is performed such that the geomagnetism is detected at a timing synchronous with the VD signal by the azimuth direction acquisition unit 111. That is to say, when power is supplied to the image capturing unit 102, a detection timing is made synchronous with the VD signal. In this case, the influence of the induced magnetic field caused by the power supply to the image capturing unit 102 is exerted, but the fluctuation of the amount of supplied current can be disregarded as compared with the length of the integration period as mentioned above. For this reason, this influence can be deemed to be a fixed influence exerted by the induced magnetic field caused by the fixed amount of current, and can be easily corrected by simple calculation using an offset value. Note that the offset value used in the correction can be obtained in advance for each amount of supplied current. The azimuth direction acquisition unit 111 in the present embodiment uses a technique of purposely detecting the geomagnetism within the transfer period of the image capturing unit 102, and performing the correction based on the offset value.

Note that the digital camera 100 in the present embodiment has, as operation modes for operating the image capturing unit 102, a plurality of kinds of operation modes including at least an electronic view finder function mode, a still image shooting mode, a moving image shooting mode, and a continuous shooting mode. In this case, since the number of pixels in the image sensor to be read out and the frame rate are different in each operation mode, the amount of power supplied to the image capturing unit 102 is also similarly different. Accordingly, it is assumed in the digital camera 100 in the present embodiment that information of an offset value to be used in the correction of the azimuth direction information performed by the azimuth direction acquisition unit 111 for each of these operation modes is stored in advance in the nonvolatile memory 103. The information of the offset value may be a measurement value (magnetic field change) that is obtained based on results of the output of the azimuth direction information by the azimuth direction acquisition unit 111 during the transfer period and the non-transfer period while actually supplying power to the image capturing unit 102 in each operation mode, and stored in the nonvolatile memory 103, for example. In another example, the information of the offset value may be calculated based on a rating current value or the like that is set so as to be applied to the image capturing unit 102 in each operation mode and stored in the nonvolatile memory 103.

Image Capturing Processing

Figure 4:
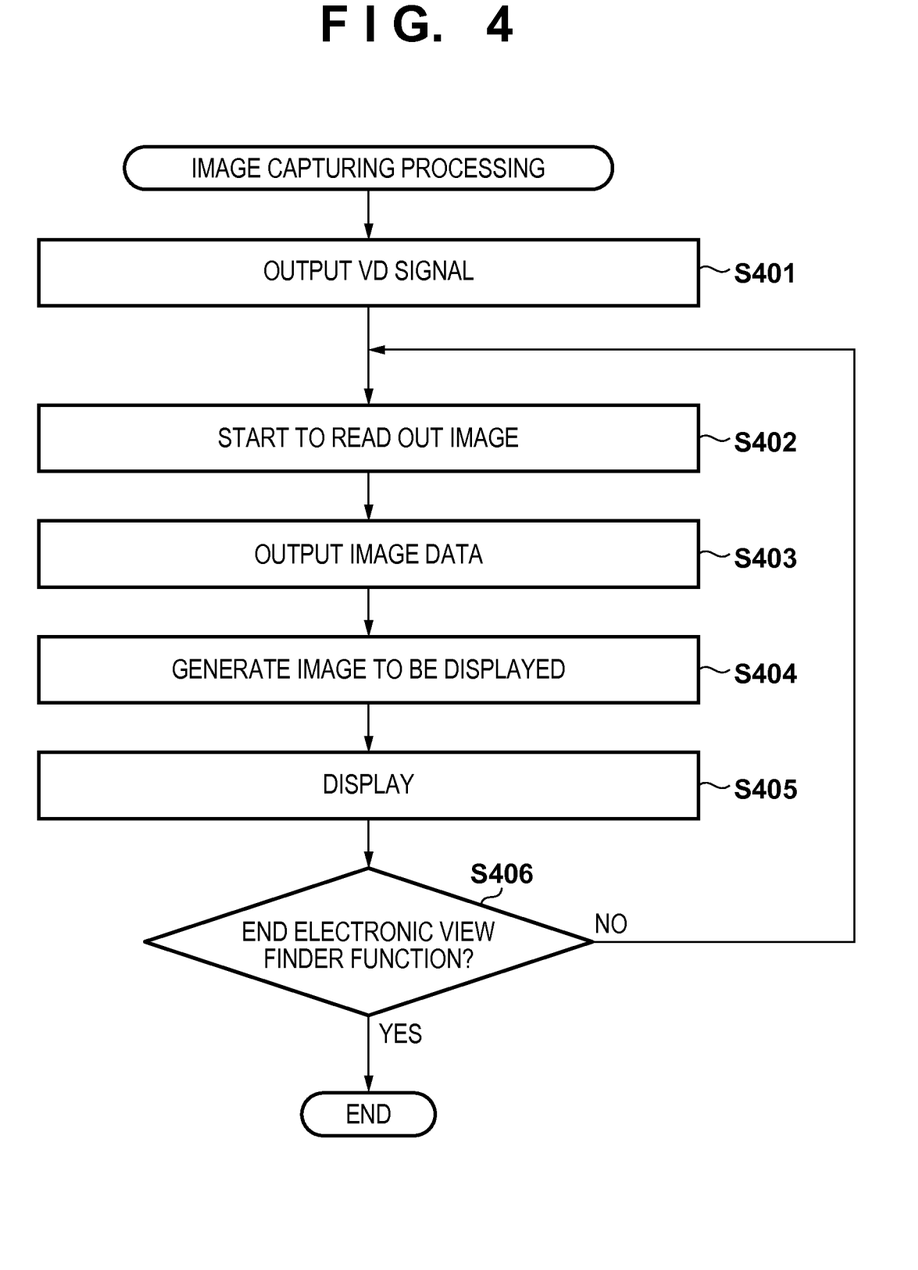
FIG. 4 is a flowchart showing exemplary image capturing processing executed in the digital camera 100 according to Embodiment 1 of the present invention.

In order to describe the azimuth direction information outputting operation performed by the azimuth direction acquisition unit 111 in the digital camera 100 in the present embodiment, a description will be given below, using a flowchart in FIG. 4, of image capturing processing related to the image capturing unit 102, taking the electronic view finder function mode among the plurality of kinds of operation modes as an example. The processing corresponding to this flowchart can be achieved by the control unit 101 reading out a corresponding processing program stored in the nonvolatile memory 103 and deploying and executing the processing program in the work memory 104, for example. It is assumed in the following description that this image capturing processing is started when the electronic view finder function mode is set, for example.

In step S401, the control unit 101 outputs the VD signal for giving an image capturing instruction to the image capturing unit 102. It is assumed that the output frequency of the VD signal is determined for the respective operation modes, and is 30 fps in the electronic view finder function mode of the digital camera 100 in the present embodiment, as mentioned above. Upon receiving the VD signals, in step S402, the image capturing unit 102 starts to read out an analog image signal. In step S403, the image capturing unit 102 applies various kinds of processing to the obtained analog image signal, outputs image data, and causes the work memory 104 to store the image data.

In step S404, the control unit 101 superimposes a GUI image that is based on the latest azimuth direction information currently stored in the work memory 104 onto the image data stored in the work memory 104, and generates image data to be displayed on the display unit 106. In step S405, the control unit 101 transfers the generated image data to be displayed to the display unit 106 and causes the display unit 106 to display the image data.

In step S406, the control unit 101 determines whether or not to end the electronic view finder function. Specifically, for example, the control unit 101 determines whether or not an operation of changing the operation mode to one in which the electronic view finder function is not executed has been performed, or whether or not an operation of turning off the power source of the digital camera 100 has been performed. If it is determined to end the electronic view finder function, the control unit 101 finishes this image capturing processing, and if not, the control unit 101 returns the processing to step S401. Note that the information of the set operation mode is stored in the work memory 104, for example, and the control unit 101 may reference this information to perform the determination in this step.

Azimuth Direction Information Output Processing

Figure 5:
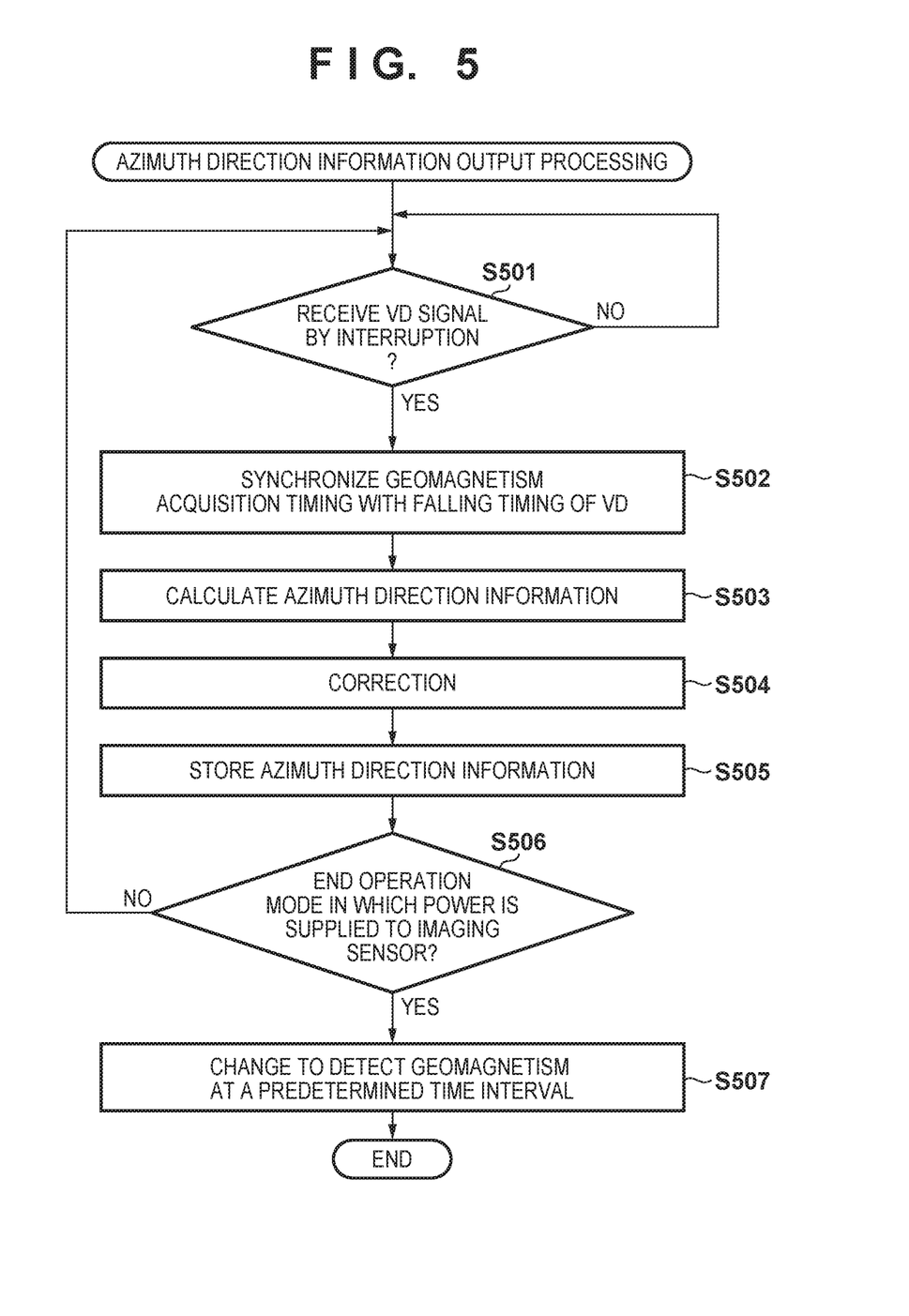
FIG. 5 is a flowchart showing exemplary azimuth direction information output processing according to Embodiment 1 of the present invention.

Azimuth direction information output processing that is executed by the azimuth direction acquisition unit 111 while the above image capturing operation is being performed will be described in detail with reference to a flowchart in FIG. 5. The processing corresponding to this flowchart can be achieved by the control unit 101 reading out a corresponding processing program stored in the nonvolatile memory 103, deploying the processing program in the work memory 104, and causing the azimuth direction acquisition unit 111 to execute the program, for example. It is assumed in the following description that this azimuth direction information output processing is started when it is determined in the digital camera 100 that an operation mode in which power is supplied to the image capturing unit 102 has been set, for example.

Figure 6A:
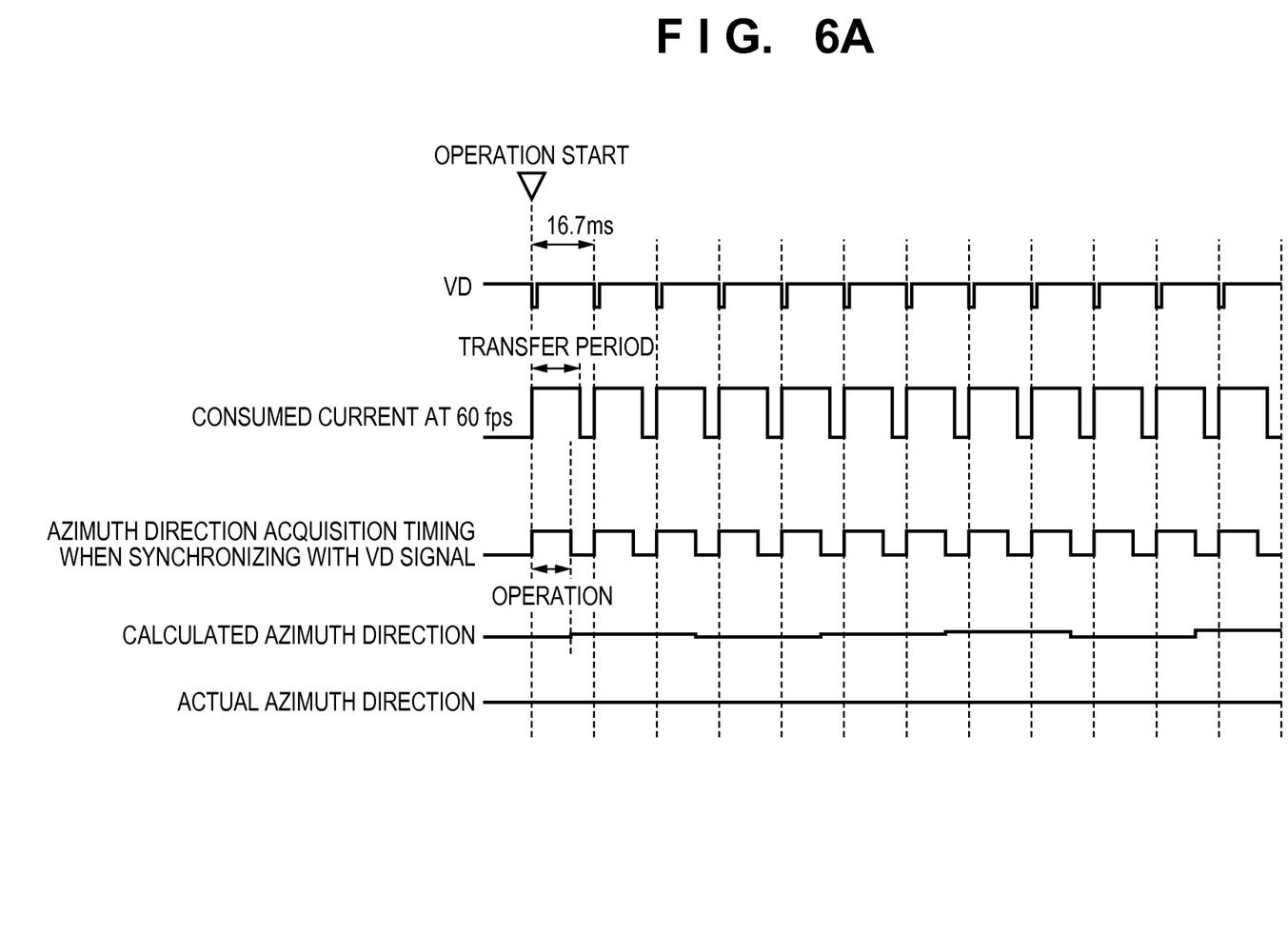
FIGS. 6A and 6B are diagrams for illustrating an operation period of an azimuth direction acquisition unit 111 according to an embodiment of the present invention.
Figure 6B:
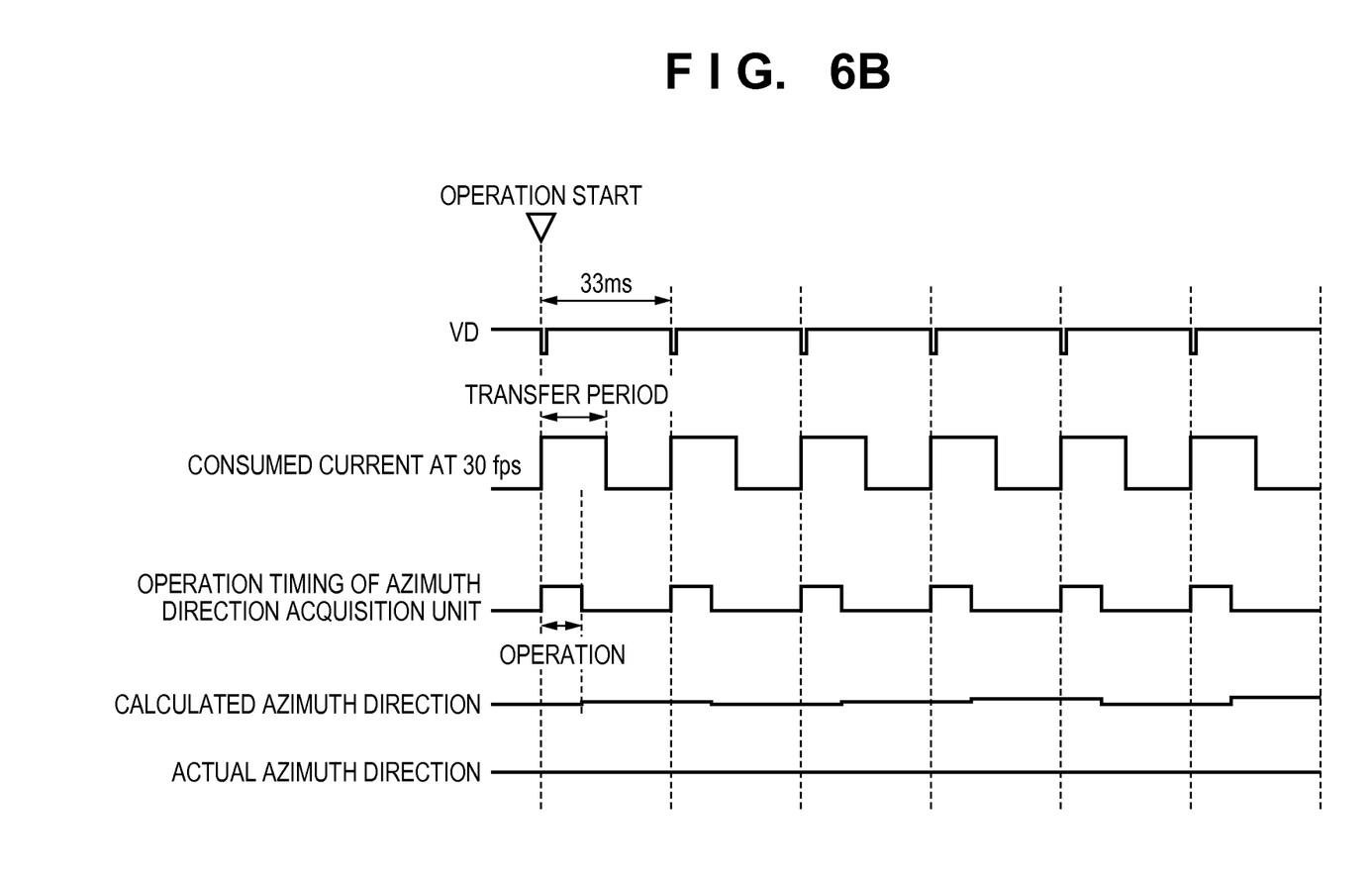

In step S501, the azimuth direction acquisition unit 111 determines whether or not the VD signal has been output to the image capturing unit 102 by the control unit 101. In the present embodiment, it is assumed that the azimuth direction acquisition unit 111 monitors the output of the VD signal to the image capturing unit 102 by the control unit 101, and if the VD signal has been output, the azimuth direction acquisition unit 111 can receive this signal by interruption. If it is determined that the VD signal has been output to the image capturing unit 102, the azimuth direction acquisition unit 111 advances the processing to step S502, and if not, the azimuth direction acquisition unit 111 repeats the processing in this step. As mentioned above, in the digital camera 100 in the present embodiment, when power is supplied to the image capturing unit 102, the azimuth direction acquisition unit 111 performs processing in steps S502 and S503 below within the transfer period of the image capturing unit 102 synchronously with the VD signal, as shown in FIGS. 6A and 6B. Note that whether the current time is within the transfer period may be determined based on information of a predetermined time period from when the VD signal for the set mode is received, for example.

In step S502, the azimuth direction acquisition unit 111 controls its own operation so as to execute the operation period for detecting the geomagnetism synchronously with the timing of detecting the VD signal. In step S503, the azimuth direction acquisition unit 111 performs processing for integrating the detection value of the geomagnetism for a prescribed operation period, and calculates the azimuth direction information that is based on the geomagnetism detected by prescribed calculation.

In step S504, the azimuth direction acquisition unit 111 acquires information of the offset value for the azimuth direction information corresponding to the currently-set operation mode from the nonvolatile memory 103, and corrects the azimuth direction information calculated in step S503, based on the acquired information. In step S505, the azimuth direction acquisition unit 111 outputs the corrected azimuth direction information and causes the work memory 104 to store the output azimuth direction information. At this time, processing related to the update to the latest azimuth direction information may be executed by the control unit 101, as mentioned above.

In step S506, the azimuth direction acquisition unit 111 determines whether or not the operation mode in which power is supplied to the image capturing unit 102 has ended. If it is determined that the operation mode in which power is supplied to the image capturing unit 102 has ended, the azimuth direction acquisition unit 111 advances the processing to step S507, and if not, the azimuth direction acquisition unit 111 returns the processing to step S501.

In step S507, the azimuth direction acquisition unit 111 controls its own operation so as to execute the operation period for detecting the geomagnetism at a predetermined time interval, rather than the timing of detecting the VD signal, and finishes the azimuth direction information output processing.

By doing so, even in an operation mode in which the azimuth direction information has to be acquired during the transfer period during which power is supplied to the image capturing unit 102, favorable azimuth direction information can be acquired by correcting the azimuth direction information obtained by detecting the geomagnetism within this transfer period.

Figure 7:
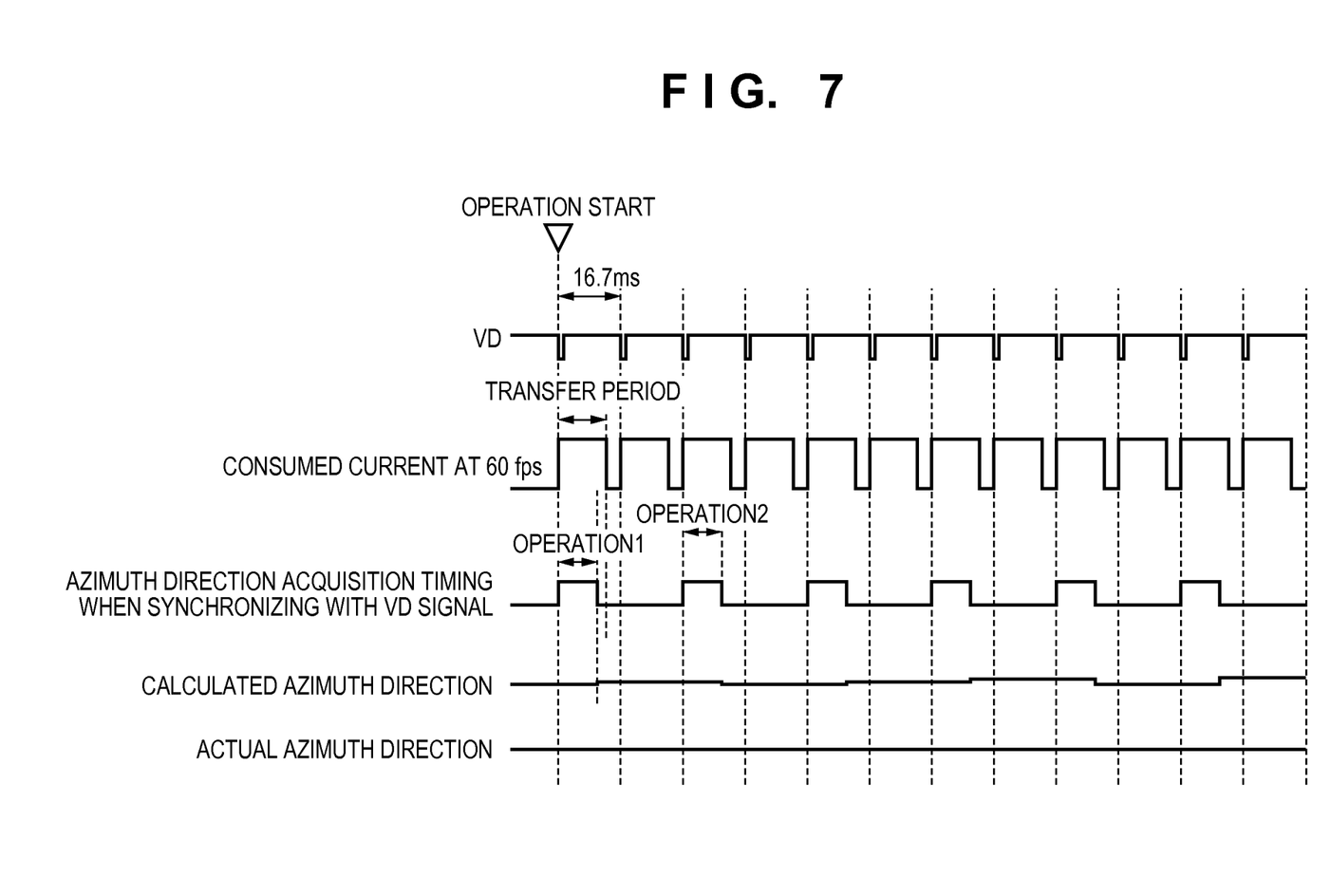
FIG. 7 is another diagram for illustrating the operation period of the azimuth direction acquisition unit 111 according to an embodiment of the present invention.

Although the azimuth direction acquisition unit 111 outputs the azimuth direction information in accordance with the output of the VD signal in the description of the present embodiment, it should be noted that in the present invention, the azimuth direction information does not need to be output synchronously with all VD signals, as shown in FIGS. 6A and 6B. That is to say, as shown in FIG. 7, the azimuth direction acquisition unit 111 may be configured to thin out received VD signals and output the azimuth direction information synchronously with only some of the signals.

As described above, the image capturing apparatus in the present embodiment can favorably detect the azimuth direction corresponding to a captured image. Specifically, the image capturing apparatus determines whether or not the current time is within the transfer period related to transfer of an image signal from the image sensor, and acquires the azimuth direction information that is based on the detection of the geomagnetism in a period that is determined to be within the transfer period. Then, the image capturing apparatus corrects the influence of the magnetic field generated during the transfer period using the acquired azimuth direction information.

Although the above description has taken the case where the azimuth direction acquisition unit 111 controls itself as an example, it should be noted that the present invention is not limited thereto. For example, a configuration may be employed in which the control unit 101 detects the VD signal and transmits an azimuth direction acquisition command to the azimuth direction acquisition unit 111 in accordance with the detection. In this case, the value detected by the azimuth direction acquisition unit 111 is delivered to the control unit 101, and the control unit 101 performs correction corresponding to the mode.

Modification

Figure 8:
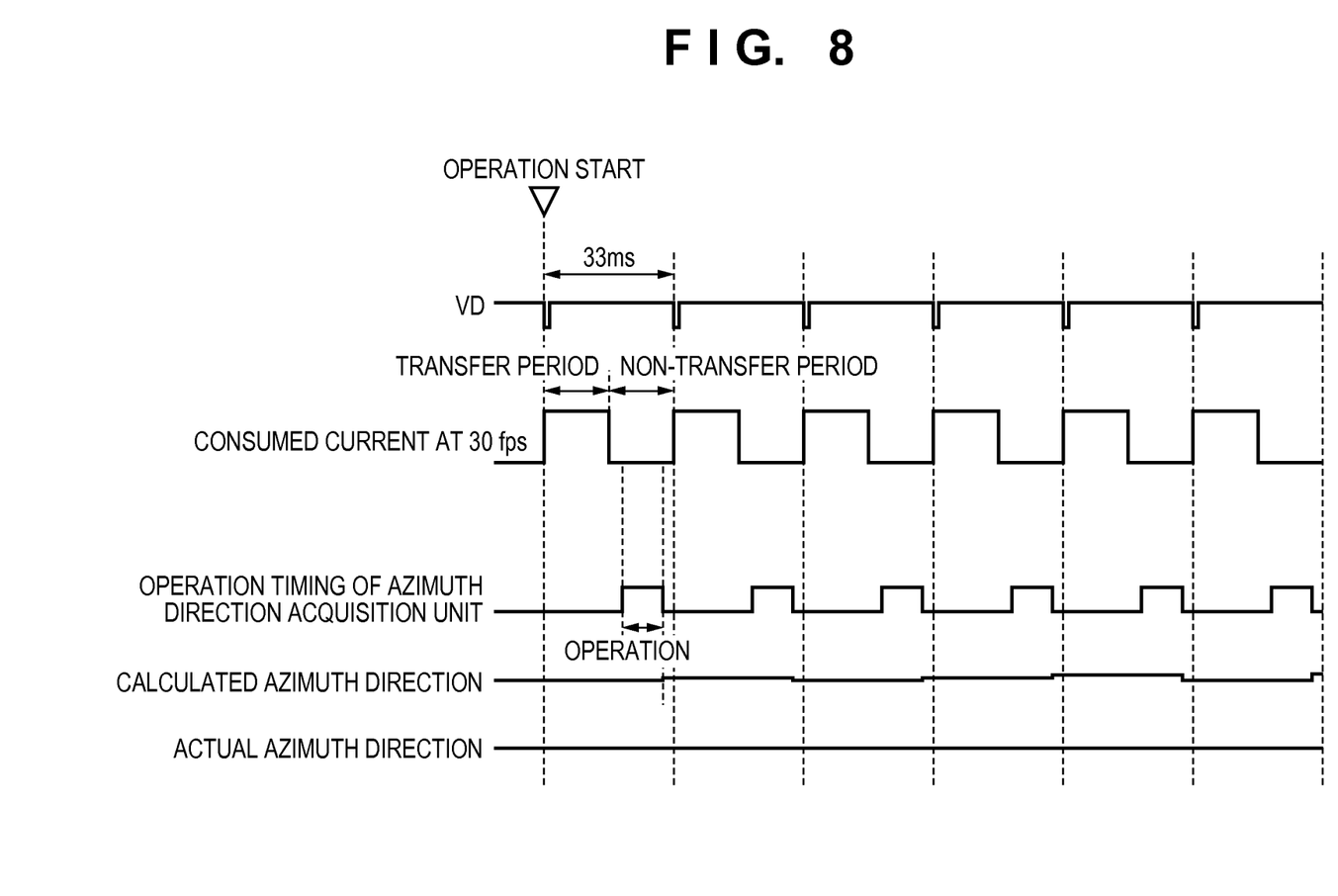
FIG. 8 is a diagram for illustrating the operation period of the azimuth direction acquisition unit 111 according to a modification of the present invention.

As mentioned above, the plurality of kinds of operation modes include a mode, such as the electronic view finder function mode, in which the non-transfer period during which power is not supplied to the image capturing unit 102 is long, and the operation period related to the geomagnetism detection of the azimuth direction acquisition unit 111 can be finished during the non-transfer period. In this case, as shown in FIG. 8, the azimuth direction acquisition unit 111 may perform operation control so as to perform the operation related to the geomagnetism detection within the non-transfer period after a lapse of the time of the transfer period from a VD period. In the above case, the influence of generation of an induced magnetic field that is based on power supply to other members may possibly be exerted, but is considered to be smaller than the influence of power supply to the image capturing unit 102, and therefore the azimuth direction acquisition unit 111 does not have to correct the azimuth direction information. Of course the azimuth direction acquisition unit 111 may be configured to operate so as to correct the influence of the generation of an induced magnetic field during the non-transfer period caused by the power supply to the other members and output more favorable azimuth direction information.

Embodiment 2

Embodiment 1 has described above the azimuth direction information output processing while taking the electronic view finder function mode as an example, whereas there are also cases where favorable azimuth direction information need only be acquired only for a shot image to be recorded as in the still image shooting mode, for example. There are also other cases where power is supplied to the image capturing unit 102 but a captured image and the azimuth direction information are not presented on the display unit 106 until the shooting finishes, as in a single-lens reflex digital camera. In this case, the azimuth direction information output processing may be the following operations.

Azimuth Direction Information Output Processing

Figure 9:
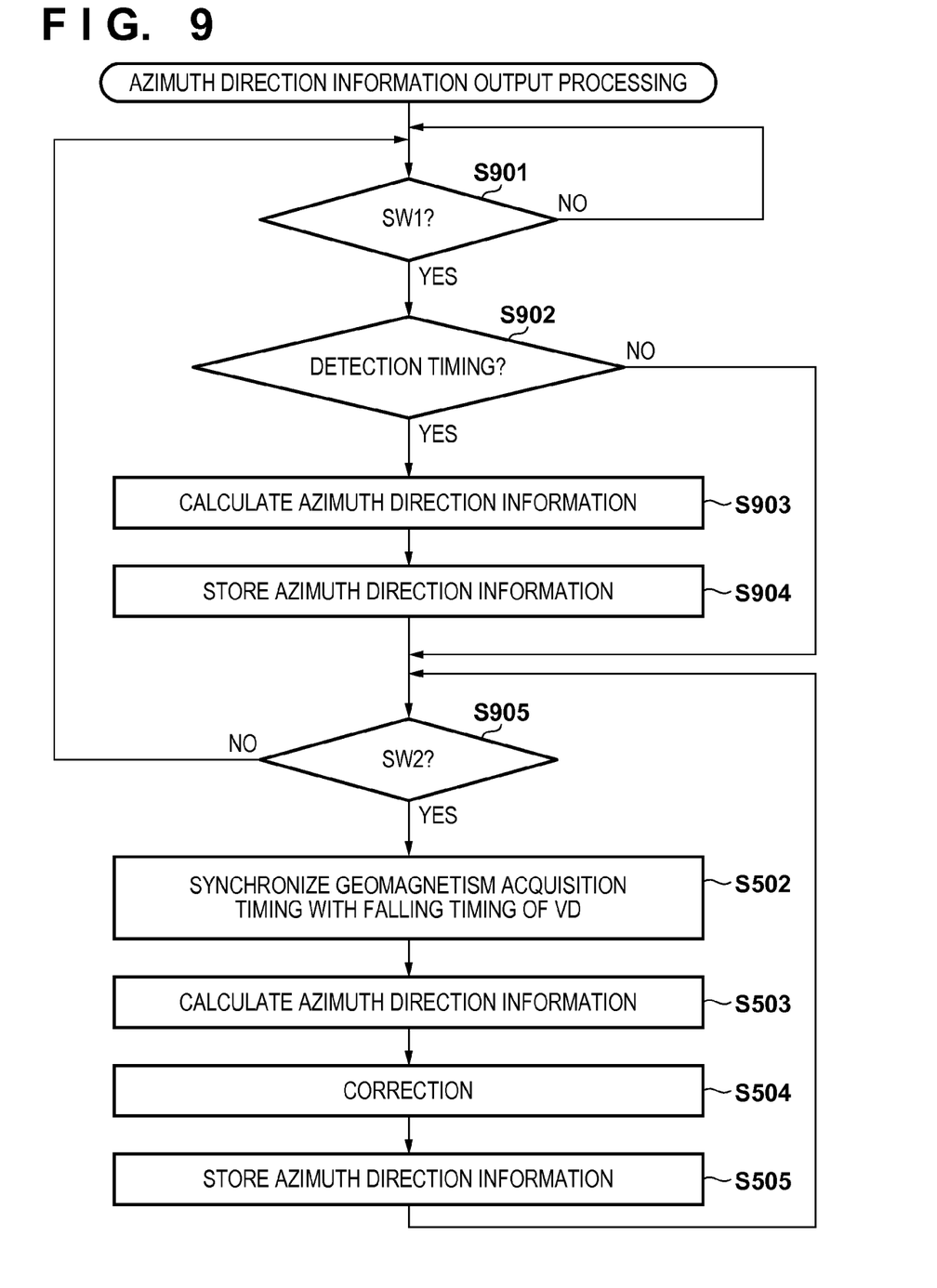
FIG. 9 is a flowchart showing exemplary azimuth direction information output processing according to Embodiment 2 of the present invention.

The azimuth direction information output processing executed in the digital camera 100 in the present embodiment will be described below with reference to a flowchart in FIG. 9. Note that, in the description of this azimuth direction information output processing, steps in which processing similar to that in the azimuth direction information output processing in Embodiment 1 described above is performed will be given the same reference numerals and a description thereof will be omitted, and only characteristic processing in the present embodiment will be described below.

In step S901, the azimuth direction acquisition unit 111 determines whether or not the SW1 signal has been output by the operation unit 105. If it is determined that the SW1 signal has been output by the operation unit 105, the azimuth direction acquisition unit 111 advances the processing to step S902, and if not, the azimuth direction acquisition unit 111 repeats the processing in step S901.

In step S902, the azimuth direction acquisition unit 111 determines whether or not the current time is a timing of detecting the geomagnetism that is determined regardless of the VD signal. If it is determined that the current time is the timing of detecting the geomagnetism, the azimuth direction acquisition unit 111 advances the processing to step S903, and if not, the azimuth direction acquisition unit 111 advances the processing to step S905.

In step S903, the azimuth direction acquisition unit 111 performs processing for integrating the detection value of the geomagnetism for a prescribed operation period, and calculates the azimuth direction information that is based on the geomagnetism detected by prescribed calculation. In step S904, the azimuth direction acquisition unit 111 outputs the calculated azimuth direction information and causes the work memory 104 to store the output azimuth direction information. At this time, processing related to the update to the latest azimuth direction information may be executed by the control unit 101, as mentioned above.

In step S905, the azimuth direction acquisition unit 111 determines whether or not the SW2 signal has been output by the operation unit 105. If it is determined that the SW2 signal has been output by the operation unit 105, the azimuth direction acquisition unit 111 advances the processing to step S502, and if not, the azimuth direction acquisition unit 111 returns the processing to step S901. Note that, after executing the processing in steps S502 to S505, the azimuth direction acquisition unit 111 returns the processing to step S905.

By doing so, favorable azimuth direction information can be acquired for a shot image to be recorded.

Embodiment 3

Although Embodiments 1 and 2 has described above the operation modes in which the image capturing unit 102 continuously performs the same processing, the implementation of the present invention is not limited thereto. For example, in an operation mode in which a still image can be shot while shooting a moving image, the amount of power supplied to the image capturing unit 102 changes, and therefore the azimuth direction acquisition unit 111 may determine the offset value of corresponding azimuth direction information and correct the azimuth direction information using this value in accordance with the amount of power supplied to the image capturing unit 102.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-185697, filed Sep. 11, 2014, which is hereby incorporated by reference herein in its entirety.

What is claimed is:

1. An image capturing apparatus comprising:
   an image capturing unit configured to capture an image of a subject and output an image signal;
   a control unit configured to control output of the image signal of the image capturing unit; and
   an azimuth direction acquisition unit configured to detect geomagnetism, and acquire azimuth direction information indicating a direction in which the image capturing apparatus is oriented, based on the detected geomagnetism,
   wherein the azimuth direction acquisition unit detects the geomagnetism during an operation of the image capturing unit, the operation being related to the output of the image signal, and acquires azimuth direction information in which an influence on the detected geomagnetism, the influence being caused by a current supplied for the output of the image signal, has been corrected,
   wherein the control unit regularly outputs an instruction to cause the image capturing unit to output the image signal,
   wherein the azimuth direction acquisition unit detects the geomagnetism in response to the instruction being regularly output from the control unit, and
   wherein the control unit regularly outputs the instruction based on a frame rate of a moving image, the frame rate being set by a user.

2. The image capturing apparatus according to claim 1, further comprising a setting unit configured to set an operation mode of the image capturing unit,
   wherein the azimuth direction acquisition unit differentiates a method for correcting the azimuth direction information in accordance with a set operation mode.

3. The image capturing apparatus according to claim 1,
   wherein the method for correcting the azimuth direction information is determined based on a frame rate related to acquisition of the image signal of the image capturing unit or an amount of a current flowing through the image capturing unit while the current is supplied, in the set operation mode.

4. The image capturing apparatus according to claim 1,
   wherein the control unit further controls an image signal that is output by the image capturing unit so as to record the image signal as an image file in a storage medium, and the image file is associated with the azimuth direction information in which the influence has been corrected.

5. The image capturing apparatus according to claim 4,
   further comprising a display unit configured to display a screen related to the image signal that is output by the image capturing unit,
   wherein the display unit displays the direction in which the image capturing apparatus is oriented on the screen in a superimposing manner based on the azimuth direction information in which the influence has been corrected.

6. A method for controlling an image capturing apparatus having an image capturing unit, the method comprising:
   an output step of outputting an image signal of a subject whose image has been captured by the image capturing unit;
   a control step of controlling the output of the image signal in the output step; and
   an azimuth direction acquisition step of detecting geomagnetism, and acquiring azimuth direction information indicating a direction in which the image capturing apparatus is oriented, based on the detected geomagnetism,
   wherein in the azimuth direction acquisition step, the geomagnetism is detected during an operation of the image capturing unit, the operation being related to the output of the image signal, and azimuth direction information in winch an influence on the detected geomagnetism, the influence being caused by a current supplied for the output of the image signal, has been corrected is acquired,
   wherein in the control step, an instruction to cause the image capturing unit to output the image signal is regularly output,
   wherein in the azimuth direction acquisition s geomagnetism is detected in response to the instruction being regularly output, and
   wherein in the control step, the instruction is regularly output based on a frame rate of a moving image, the frame rate being set by a user.

7. A non-transitory computer-readable storage medium recording a program for causing a computer, which comprises an image capturing unit configured to capture an image of a subject and output an image signal, to function as the following units:
   a control unit configured to control output of the image signal of the image capturing unit; and
   an azimuth direction acquisition unit configured to detect geomagnetism, and acquire azimuth direction information indicating a direction in which the image capturing apparatus is oriented, based on the detected geomagnetism,
   wherein the azimuth direction acquisition unit detects the geomagnetism during an operation of the image capturing unit, the operation being related to the output of the image signal, and acquires azimuth direction information in which an influence on the detected geomagnetism, the influence being caused by a current supplied for the output of the image signal, has been corrected,
   wherein the control unit regularly outputs an instruction to cause the image capturing unit to output the image signal,
   wherein the azimuth direction acquisition unit detects the geomagnetism in accordance with the instruction being regularly output from the control unit, and wherein the control unit regularly outputs the instruction based on a frame rate of a moving image, the frame rate being set by a user.

\* \* \* \* \*